(12) United States Patent
Tanizawa et al.

(10) Patent No.: US 11,436,490 B2
(45) Date of Patent: Sep. 6, 2022

(54) PROVIDING APPARATUS, PROVIDING METHOD, AND COMPUTER PROGRAM PRODUCT

(71) Applicant: KABUSHIKI KAISHA TOSHIBA, Minato-ku (JP)

(72) Inventors: Akiyuki Tanizawa, Kawasaki (JP); Atsushi Yaguchi, Taito (JP); Shuhei Nitta, Ota (JP); Yukinobu Sakata, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 396 days.

(21) Appl. No.: 16/802,231

(22) Filed: Feb. 26, 2020

(65) Prior Publication Data

US 2021/0081781 A1    Mar. 18, 2021

(30) Foreign Application Priority Data

Sep. 12, 2019  (JP) .............................. JP2019-166084

(51) Int. Cl.
*G06N 3/08* (2006.01)
*G06N 20/20* (2019.01)
(Continued)

(52) U.S. Cl.
CPC ............. *G06N 3/08* (2013.01); *G06N 3/0454* (2013.01); *G06N 5/04* (2013.01); *G06N 20/20* (2019.01)

(58) Field of Classification Search
CPC .......... G06N 3/08; G06N 3/0454; G06N 5/04; G06N 20/20; G06N 3/082; G06N 3/0481
See application file for complete search history.

(56) References Cited

U.S. PATENT DOCUMENTS 11,087,883 B1 *   8/2021  Narayanan ............... G06N 3/08
2019/0325348 A1 * 10/2019  Carranza ............. G06K 9/6253
(Continued)

FOREIGN PATENT DOCUMENTS

JP       2021-12553 A     2/2021
WO   WO2018/173121 A1    9/2018

OTHER PUBLICATIONS

Wei Liu, et.al., "SSD: Single Shot MultiBox Detector" arXiv: 1512.02325v5, https://arxiv.org/abs/1512.02325, Dec. 29, 2016, 17 pages.
(Continued)

*Primary Examiner* — Beemnet W Dada
(74) *Attorney, Agent, or Firm* — Oblon, McClelland, Maier & Neustadt, L.L.P.

(57) ABSTRACT

A providing apparatus according to an embodiment of the present disclosure includes a memory and a hardware processor coupled to the memory. The hardware processor is configured to: store, in the memory, a first machine learning model capable of changing an amount of calculation of a model of a neural network; acquire device information; set, based on the device information, extraction conditions representing conditions for extracting second machine learning models from the first machine learning model; extract the second machine learning models from the first machine learning model based on the extraction conditions; and provide the second machine learning models to a device specified by the device information.

13 Claims, 17 Drawing Sheets

(51) Int. Cl.
 *G06N 5/04* (2006.01)
 *G06N 3/04* (2006.01)

(56) References Cited

U.S. PATENT DOCUMENTS

| | | |
|---|---|---|
| 2021/0012228 A1 | 1/2021 | Yaguchi et al. |
| 2021/0073377 A1* | 3/2021 | Coull .................. G06N 3/0454 |
| 2021/0125056 A1* | 4/2021 | Kim ........................ G06N 3/08 |
| 2021/0192368 A1* | 6/2021 | Schall .................. G06N 20/00 |
| 2021/0343406 A1* | 11/2021 | McMillan .............. G16H 50/20 |

OTHER PUBLICATIONS

Ricky T.Q.Chen, et.al. "Neural Ordinary Differential Equations", arXiv: 1806.07366v4, Jan. 15, 2019, 19 pages.

\* cited by examiner

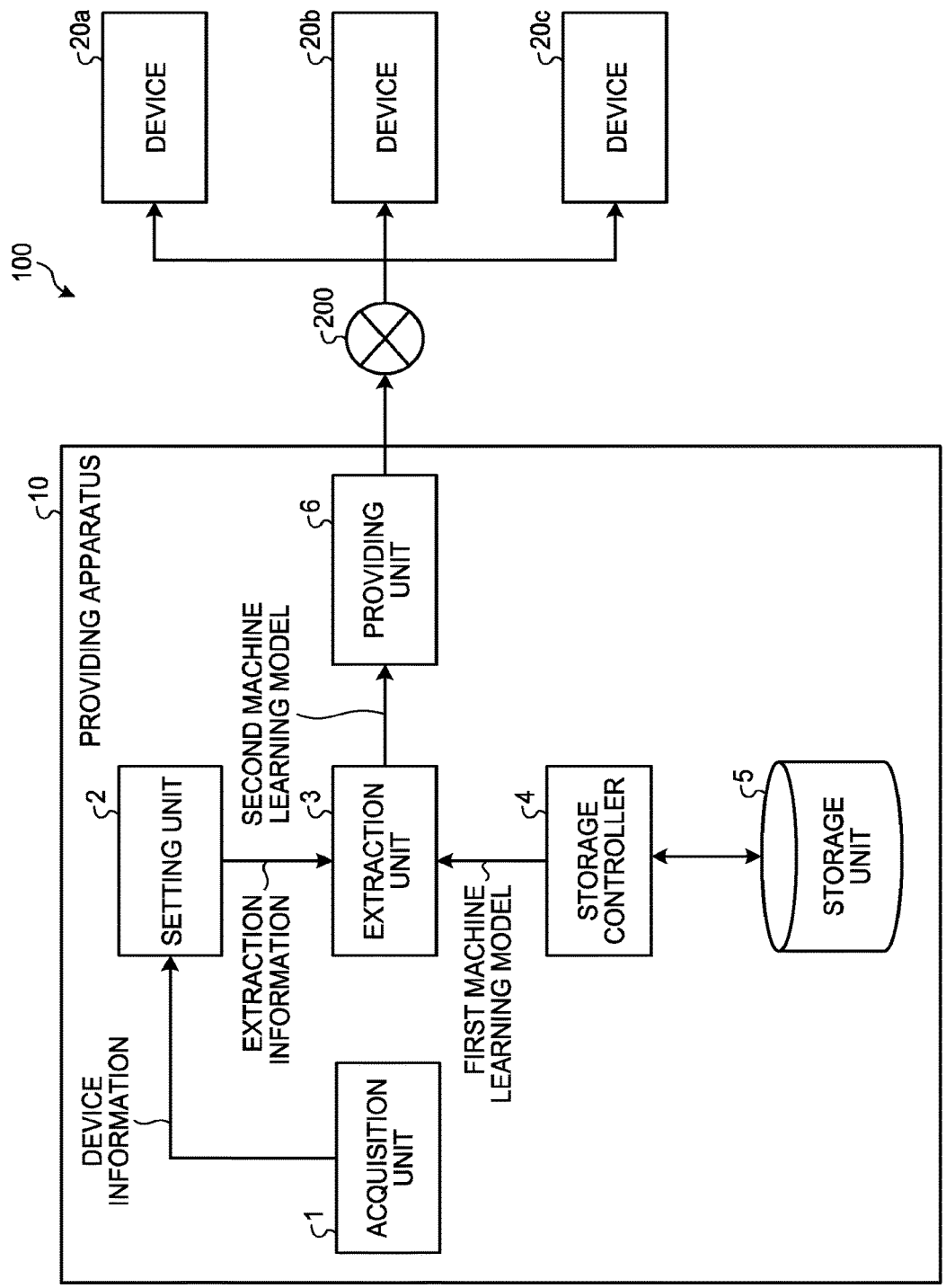

FIG.2

| | IDENTIFICATION INFORMATION | | SPECIFICATION INFORMATION | | | | CONTROL INFORMATION | | | |
|---|---|---|---|---|---|---|---|---|---|---|
| GROUP ID | DEVICE ID | DEVICE NAME | DEVICE TYPE | DEVICE COMPUTING CAPACITY | MEMORY SIZE | TARGET AMOUNT OF CALCULATION | TARGET MODEL SIZE | TARGET LATENCY | TARGET RECOGNITION RATE | |
| 01 | 0001 | OOO FOR VEHICLE | SoC | 10 MFlops | 1 GiB | 5 MFlops | 100 KB | 10 msec | N/A | ⋮ |
| 02 | 0011 | OOO FOR ROBOT | LSI | 20 MFlops | 2 GiB | 20 MFlops | 200 KB | 100 msec | 85% | ⋮ |
| 03 | 0112 | OOO FOR CAMERA | CPU | 30 MFlops | 3 GiB | 2 MFlops | 1 MB | 200 msec | 90% | ⋮ |
| 04 | 0222 | OOO FOR IMAGE INSPECTION | FPGA | 100 MFlops | 4 GiB | 100 MFlops | N/A | 100 msec | N/A | ⋮ |
| 05 | 1119 | OOO FOR IMAGE ANALYSIS | GPU | 1 GMFlops | 5 GiB | N/A | N/A | 1000 msec | N/A | ⋮ |
| 06 | 1111 | OO FOR MONITORING CAMERA | GPU | 138 GMFlops | 64 GiB | 50 GFlops | N/A | N/A | N/A | ⋮ |
| ⋮ | ⋮ | ⋮ | ⋮ | ⋮ | ⋮ | ⋮ | ⋮ | ⋮ | ⋮ | ⋮ |

FIG.3

| EXTRAC-TION ID | CONTROL RANK | MODEL INFORMATION | | ... | INFERENCE INFORMATION | | | ... |
| --- | --- | --- | --- | --- | --- | --- | --- | --- |
| | RANK | MODEL SIZE | AMOUNT OF CALCULATION | | LATENCY | RECOGNI-TION RATE | MEMORY SIZE | |
| 0001 | 500 | 10 MB | 100 GFlops | ... | 3000 msec | 99% | 1 GB | ... |
| 0002 | 300 | 5 MB | 50 GFlops | ... | 2000 msec | 97% | 500 MB | ... |
| 0003 | 200 | 3 MB | 500 MFlops | ... | 1000 msec | 95% | 300 MB | ... |
| 0004 | 100 | 1 MB | 300 MFlops | ... | 500 msec | 93% | 100 MB | ... |
| 0005 | 50 | 500 KB | 100 MFlops | ... | 300 msec | 92% | 50 MB | ... |
| 0006 | 20 | 100 KB | 50 MFlops | ... | 100 msec | 91% | 10 MB | ... |
| ... | ... | ... | ... | ... | ... | ... | ... | ... |

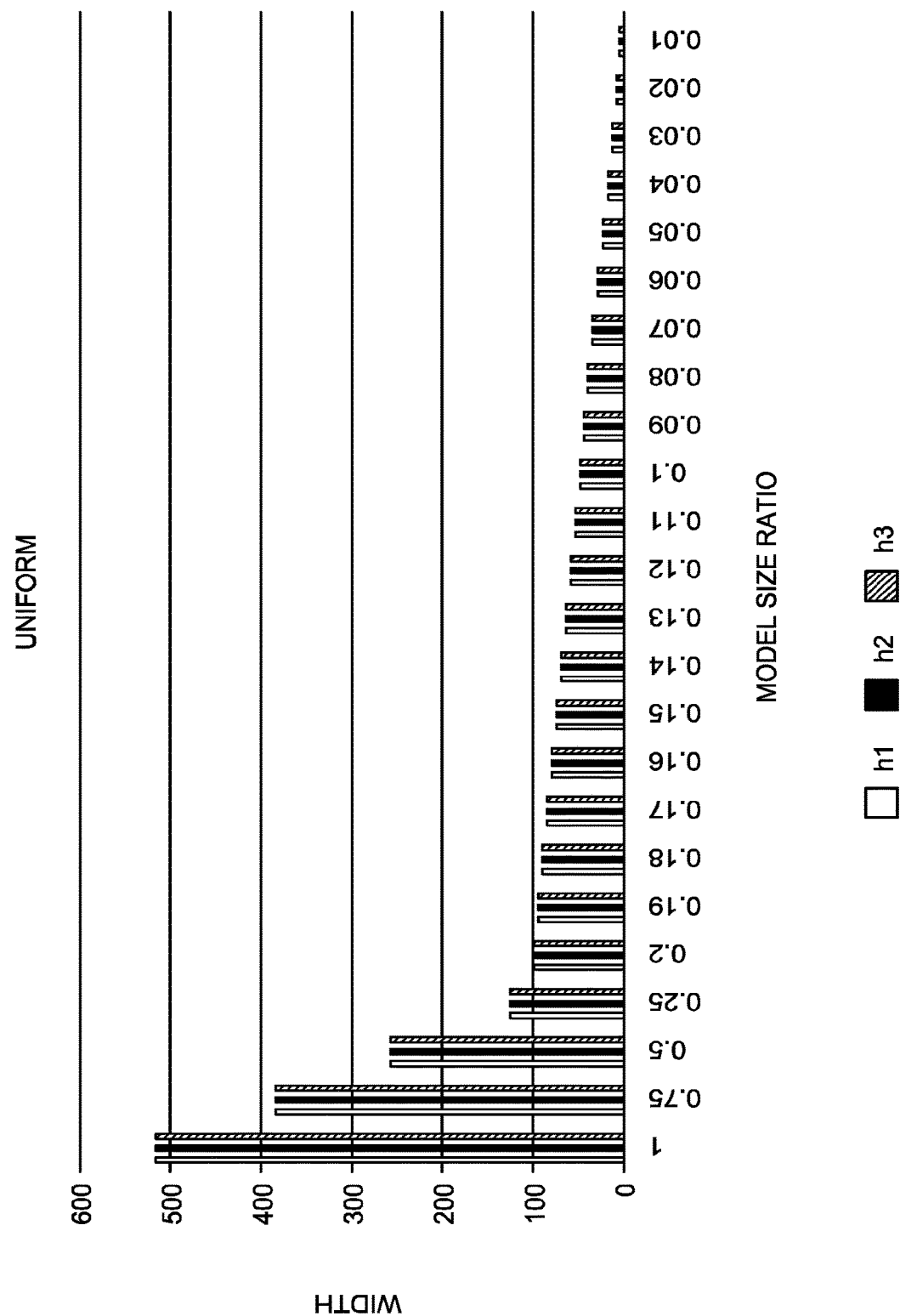

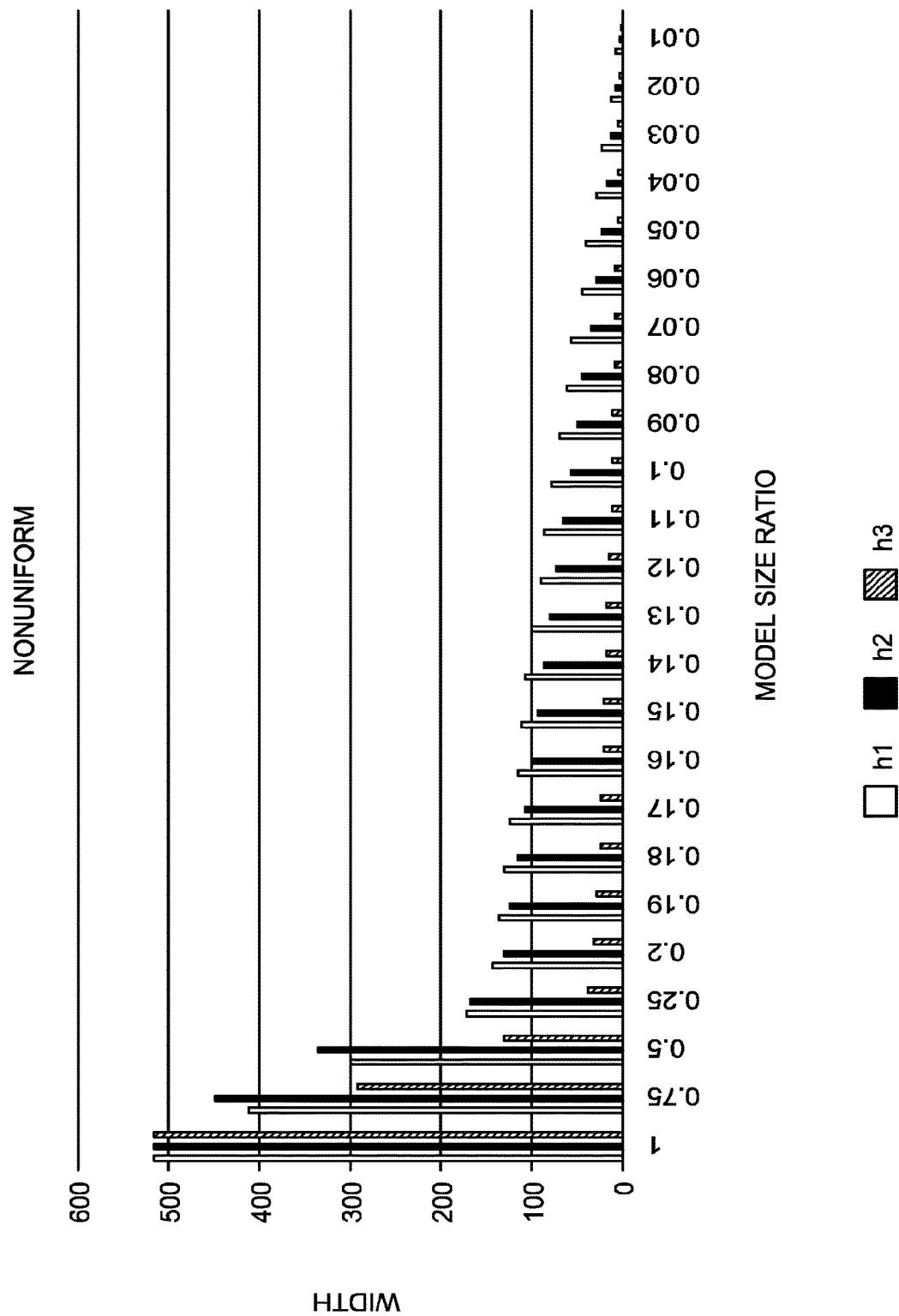

FIG.10

| DEVICE INFORMATION | | DEPLOYMENT INFORMATION | | LEARNING INFORMATION | | |
|---|---|---|---|---|---|---|
| GROUP ID | DEVICE ID | DEPLOYMENT DATE | EXTRAC-TION ID | MODEL ID | MODEL GENERATION DATE | DATA ID |
| 01 | 001 | 2019/06/11 | 0001 | 000001 | 2019/06/09 | 000001 |
| 01 | 002 | 2019/06/11 | 0001 | 000001 | 2019/06/09 | 000001 |
| 01 | 002 | 2019/06/12 | 0002 | 000001 | 2019/06/09 | 000001 |
| 01 | 003 | 2019/06/13 | 0001 | 000001 | 2019/06/10 | 000001 |
| 01 | 003 | 2019/06/14 | 0001 | 000002 | 2019/06/11 | 000002 |
| ... | ... | ... | ... | ... | ... | ... |

PROVIDING APPARATUS, PROVIDING METHOD, AND COMPUTER PROGRAM PRODUCT

CROSS-REFERENCE TO RELATED APPLICATIONS

This application is based upon and claims the benefit of priority from Japanese Patent Application No. 2019-166084, filed on Sep. 12, 2019; the entire contents of which are incorporated herein by reference.

FIELD

Embodiments described herein relate generally to a providing apparatus, a providing method, and a computer program product.

BACKGROUND

In fields of image recognition, voice recognition, text processing, and the like, performance have been enhanced by making use of a neural network (machine learning model). In general, the neural network frequently uses a method of using deep learning in which the neural network includes a number of layers, and in which a value of each node in each layer is calculated by summing values obtained by multiplying values of respective nodes in a preceding layer by a weighting coefficient.

BRIEF DESCRIPTION OF THE DRAWINGS

FIG. 1 is a diagram illustrating an example of a functional configuration of a providing system according to a first embodiment;
FIG. 2 is a diagram illustrating an example of device information according to the first embodiment;
FIG. 3 is a diagram illustrating an example of an extraction condition list according to the first embodiment;
FIG. 6A is a diagram illustrating a setting example of the width r (in a case of uniform) according to the first embodiment;
FIG. 6B is a diagram illustrating a setting example of the width r (in a case of non-uniform) according to the first embodiment;
FIG. 10 is a diagram illustrating an example of management information according to the second embodiment.

DETAILED DESCRIPTION

Figure 4:
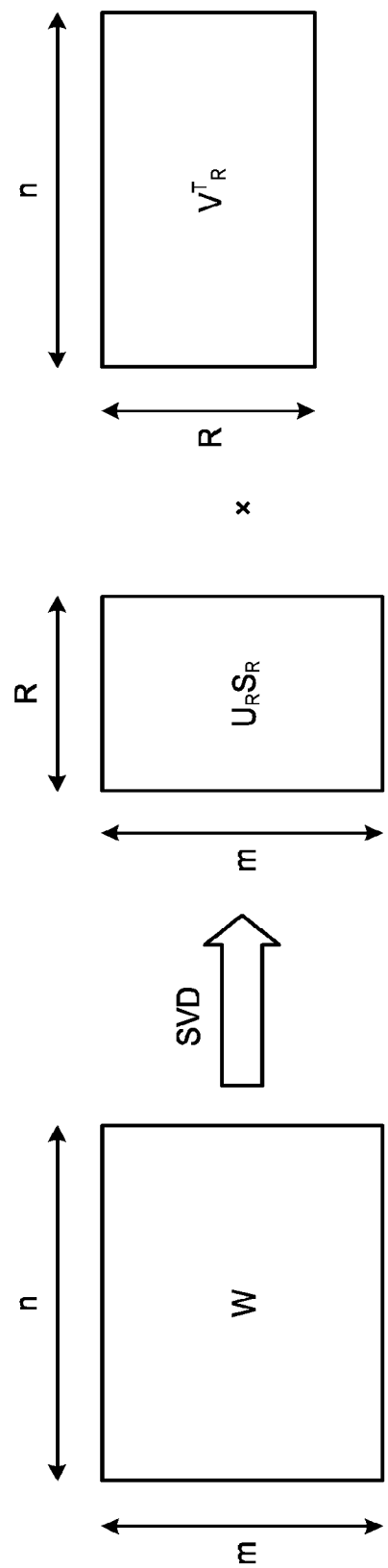
FIG. 4 is a diagram illustrating an example of a first machine learning model having decomposed layers obtained by decomposing a tensor of weighting coefficients.

A providing apparatus according to an embodiment of the present disclosure includes a memory and a hardware processor coupled to the memory. The hardware processor is configured to: store, in the memory, a first machine learning model capable of changing an amount of calculation of a model of a neural network; acquire device information; set, based on the device information, extraction conditions representing conditions for extracting second machine learning models from the first machine learning model; extract the second machine learning models from the first machine learning model based on the extraction conditions; and provide the second machine learning models to a device specified by the device information.

The following describes embodiments of a providing apparatus, a providing method, and a computer program product in detail with reference to the accompanying drawings.

A network obtained by deep learning is called a deep neural network (DNN), and is characterized by being large in amount of calculation or large in number of parameters because, for example, convolutional processing and fully connected processing are executed in each layer. When the DNN is implemented by, for example, hardware, the DNN uses a large amount of memory and transfers a large amount of data because of processing a large amount of weighting coefficient data, and thus, is characterized by having difficulty in executing real-time inference processing on an edge device, such as a mobile or in-vehicle device, having relatively Resource-constrained hardware specifications. Techniques have been developed to reduce a model size of such a trained neural network (hereinafter, called a model) using, for example, a pruning method or learning method with knowledge distillation. Approaches that use machine learning including the deep learning generally include a learning process and an inference process. The learning process designs the model by executing iterative processing on a prepared dataset and the model before being trained, and therefore, is difficult to be executed on the edge device. Therefore, model providing systems are disclosed that execute the learning phase in a large-scale server environment including a graphic processing unit (GPU), and provide (or deploy) the trained model to the edge device. The edge device uses the deployed model to execute only the inference process, and thus, even the small-scale edge device can execute accurate recognition processing.

First Embodiment

Firstly, an example of a functional configuration of a providing system 100 according to a first embodiment will be described.

Example of Functional Configuration

FIG. 1 is a diagram illustrating the example of the functional configuration of the providing system 100 according to the first embodiment. The providing system 100 according to the first embodiment includes a providing apparatus 10 and devices 20a to 20c. The providing apparatus 10 is connected to the devices 20a to 20c over a network 200. Hereinafter, the devices 20a to 20c are each simply called a device 20 when no distinction is needed between them.

The communication system of the network 200 may be a wired system or a wireless system, or may be provided by combining the wired system with the wireless system. The network 200 may be implemented by a dedicated communication line allowing high-speed communication, or may be implemented by a public network line. The network 200 may also be implemented by combining the dedicated communication line with the public network line.

The providing apparatus 10 according to the first embodiment includes an acquisition unit 1, a setting unit 2, an extraction unit 3, a storage controller 4, a storage unit 5, and a providing unit 6.

The device 20 will be described. The devices 20a to 20c may have the same hardware specifications, or have different hardware specifications.

The device 20 may be, for example, a device that is mounted on a mobile body, such as an automobile, a drone, or a railway vehicle. To implement an autonomous vehicle, a number of sensors are mounted on an automobile, and a neural network performs inference on sensed information (for example, an image captured by a camera) to execute the recognition processing. In this case, the inference by the neural network is, for example, detection of an object from the image, classification of the detected object, and measurement of a distance to the detected object.

The device 20 may also be a device that is mounted on, for example, a robot or an inspection device installed in a production line of a factory. For example, in an appearance inspection, the neural network executes the recognition processing by inferring whether any abnormality is present in the data captured by a sensor. In this case, the inference by the neural network is, for example, the determination of whether the abnormality is included and extraction of an abnormal portion.

The device 20 may also be a device mounted on, for example, a truck, or a mobile body or a robot used for delivery or in a warehouse. For example, a picking robot used in, for example, the warehouse executes the recognition processing by sensing a picking target area and performing the inference on the sensed data with the neural network. In this case, the inference by the neural network is, for example, determination of the number of pieces of luggage included in the picking target area, and determination of the width, height, and depth of each piece of the luggage.

The device 20 may also be, for example, a camera device that is used for checking entrance and exit to and from a building, an event site, or the like. Specifically, the device 20 may be a smartphone or a mobile terminal on which an application for, for example, checking a face and a gait of, and biological information on a particular person is installed. The application may be, for example, an application that uses the machine learning for processing and automatically tagging captured images or moving images, and recognizing a face and a person in the captured images or moving images to organize them into an album. The processing, the tagging, and the recognition are general examples in the machine learning, and the above-described applications can be obtained by executing the inference processing using the pre-trained model.

The examples of the device 20 in the present disclosure have been described above. The device 20 has the inference function using the neural network provided in the device 20 that is required to execute the real-time processing on the edge side, and the above-described device 20 is connectable to the network 200. In a system in which data sensed on the edge side is transmitted to a server, such as a cloud server, and the edge side device receives a result of the inference processing executed on the server side, there is a problem of a latency caused by, for example, the communication with the server. Since the real-time processing is the most important, the edge device is preferably provided with hardware that executes the inference processing in the neural network. The system described above is herein called a real-time edge system.

Although different in application from that described above, the device 20 may be considered to be a device such as a monitoring camera. For example, the device is a monitoring system that detects a particular object or action, such as a suspicious individual, a dangerous object, or illegal dumping captured by the monitoring camera. The monitoring camera generally captures a moving image of a monitored area, and the moving image is played when an event occurs (when the event is checked). However, since the moving image data is larger in data volume than, for example, a still image, all pieces of the moving image data cannot always be uploaded to the server side, such as the cloud server. As described above, from the viewpoint of the amount of communication, depending on the application, the edge device executes the recognition processing, and transmits only the recognition result to, for example, the cloud server. A case can also be considered where not all but some of the moving image data is transmitted to the cloud server, or the moving image data is stored in a local storage or an edge server for a certain period. In this way, when a communication cost of the system is high, the case can be considered where the edge device is provided with the hardware that executes the inference processing in the neural network. The system described above is herein called an analytics edge system.

The real-time edge system can be combined with the analytics edge system. Such a system is called a hybrid edge system.

The devices 20 may be connected to one another over the network 200. The above-described devices 20 are generally hardware selected depending on the application, and may differ from one another in specifications. In all cases, the devices 20 have the function to execute the inference processing using the trained model.

In the first embodiment, as a simple example, the devices 20 are each an in-vehicle large-scale integrated circuit (LSI). A case will be described in which the device 20a is mounted on a general vehicle, the device 20b is mounted on a luxury car, and the device 20c is mounted on a special-purpose vehicle, with the hardware specifications thereof different from one another.

The following describes the acquisition unit 1.

The acquisition unit 1 acquires device information on the device 20 serving as a target of the deployment.

Example of Device Information

FIG. 2 is a diagram illustrating an example of the device information according to the first embodiment. The device information according to the first embodiment includes identification information, specification information, and control information.

The identification information is information for identifying a device. The identification information includes, for example, a group identifier (ID), a device ID, and a device name. The group ID is identification information for identifying a group to which the device belongs. The device ID is identification information for identifying the device. The device name is a proper name of the device.

Specifically, the identification information is used as information for identifying, among a plurality of edge devices, the device 20 that serves as a destination of the deployment. The identification information preferably includes a unique ID for identifying each individual device 20 among devices of the same types. The identification information includes various kinds of information, such as installation positions, applications, purposes of use, and remarks, about the devices 20 as important information for managing the devices 20. Information on hardware and software of the devices 20 corresponds to specification information described below.

The specification information is information representing hardware specifications of the devices 20 that execute the inference processing using the machine learning model. The specification information includes, for example, a device type, a device computing capacity, and a memory size. The device type is information indicating a type of the device 20, for example, whether the device 20 is a general-purpose computing device, such as a central processing unit (CPU), or a dedicated computing device, such as a field-programmable gate array (FPGA), an LSI, or a system-on-chip (SoC). In recent years, devices have increased that are each provided with a hardware accelerator as a device for use in the inference of a deep learning model on the edge device. In each of those devices, the recognition processing of the device can be programmably changed by changing the deployed model. The device computing capacity is, for example, a computing capacity represented in floating-point operations per second (FLOPS), although the style of the representation differs depending on the device type. The memory size is an amount of memory provided in the device 20. The specification information may include information depending on the hardware specifications, such as a memory bandwidth and a power consumption, in addition to the device type, the device computing capacity, and the memory size described above. When the edge device is a small computer, the specification information includes, for example, a type of an installed operating system (OS), device driver information, firmware information, a name and a version of the software for executing the inference processing, and framework information.

The control information is information that is controlled in the inference processing using the model. The control information includes at least one of, for example, a target amount of calculation, a target model size, target latency, and a target recognition rate. The target amount of calculation is a target amount of calculation of the inference processing executed on the device 20 provided with the model. The target model size is a target size of the model used in the inference processing executed on the device 20. The target latency represents a target speed of the inference processing executed on the device 20 provided with the model. The target recognition rate is a target recognition rate of the inference processing executed on the device 20 provided with the model. The target recognition rate includes, for example, a classification rate in a case of a classification task, a detection rate in a case of a detection task, or an F-value or a precision or recall value in a case of a segmentation task.

In addition to the target amount of calculation, the target model size, the target latency, and the target recognition rate described above, the control information may include information on, for example, the number of models provided, orders of priority of the models, calculation accuracy (for example, 8 bits, 12 bits, or 16, bits) of the models, and a target power consumption.

The control information described above is used as, for example, design information about applications that operate on the devices.

In a case of deploying the model to the device 20 in accordance with upper limits of the hardware specifications of the devices 20, the providing apparatus 10 deploys the model while placing a greater importance on the specification information described above. In contrast, in a case of deploying a plurality of models, the providing apparatus 10 is required to control which of the models is deployed at which order of priority within the upper limits of the specification information described above.

In FIG. 2, while the case is illustrated as an example in which the device information includes the identification information, the specification information, and the control information, supplementary information related to these pieces of information may be added to the device information. For example, when the same specification information is used for different applications, a device name may be added to the identification information. Alternatively, information such as a Uniform Resource Locator (URL) for introduction of a product may be added to the specification information. The devices 20 and the models deployed thereto are managed to make connections with each other, so that information facilitating the management is preferably stored as the device information.

The control information is not needed be included in the device information. For example, in FIG. 2, in a record for a device ID 1119 of a device group 05, the target amount of calculation and the target model size are indicated as not applicable (N/A). Such a case means that a higher priority is basically given to control conditions for target values other than the items indicated as N/A. In this case, extraction conditions (to be described later) are set such that the target latency is 1000 msec or shorter.

Referring beck to FIG. 1, the acquisition unit 1 acquires the device information from, for example, the device 20a. The acquisition unit 1 may directly acquire the device information from the device 20a over the network 200, or may acquire the device information from another system connected to the network 200. The other system connected to the network 200 is, for example, a model learning device, a model designing device, or a model management application.

After acquiring the device information, the acquisition unit 1 supplies the device information to the setting unit 2.

The following describes the setting unit 2.

After receiving the device information from the acquisition unit 1, the setting unit 2 sets, based on the device information, the extraction conditions representing conditions for extracting a second machine learning model from a first machine learning model. The setting unit 2 sets the extraction conditions by selecting the extraction conditions from an extraction condition list based on, for example, the specification information and the control information included in the device information.

Example of Extraction Conditions

FIG. 3 is a diagram illustrating an example of the extraction condition list according to the first embodiment. In the example of FIG. 3, the extraction condition list includes control ranks, model information and inference information.

The control ranks each include an extraction ID and a rank. The extraction ID is identification information for identifying the extraction conditions included in the extraction condition list. The rank represents a rank for controlling the amount of calculation of the second machine learning model. The rank of the second machine learning model will be described later.

The model information includes, for example, the model size and the amount of calculation. The model size represents a size of the second machine learning model. The amount of calculation is an amount of calculation of the inference processing using the second machine learning model.

The inference information includes, for example, the latency, the recognition rate, and the memory size. The latency represents a speed of the inference processing executed on a device provided with the second machine learning model. The recognition rate represents a recognition rate of the inference processing executed on the device provided with the second machine learning model. The memory size represents a size of a memory required for executing the inference processing executed on the device provided with the second machine learning model.

The setting unit 2 sets the extraction conditions by selecting, from the extraction condition list, extraction conditions satisfying the specification information and the control information included in the device information. For example, the following describes an exemplary case of a device group 06 and a device ID 1111 in the device information illustrated in FIG. 2. In this example, a target amount of calculation of 50 GFLOPS is specified in the control information. It is understood by referring to FIG. 3 that, the extraction ID satisfying the amount of calculation of 50 GFLOPS is found to be 0002. Thus, the setting unit 2 sets the extraction conditions identified by the extraction ID 0002.

When a plurality of items are specified in the control information included in the device information, the setting unit 2 sets, for example, the extraction conditions satisfying all the items.

The following describes an example in which, when a plurality of items are specified, an extraction ID satisfying all the items is selected. For example, in an example of a device ID 0222 of a device group 04 in FIG. 2, the target amount of calculation is 100 MFLOPS or smaller, and the target latency is 100 msec or shorter. In the extraction condition list of FIG. 3, an extraction ID 0006 satisfies these two conditions. In this case, the setting unit 2 sets the extraction conditions identified by the extraction ID 0006.

For another example, when a plurality of items are specified in the control information included in the device information, the setting unit 2 sets the extraction conditions satisfying the items included in the control information in the order of priority in accordance with a predetermined policy. For example, the setting unit 2 may set orders of priority for the control information, and set the extraction conditions giving a higher priority to an item having a higher order of priority within an allowable range based on the specification information. For example, in the example of the device ID 0222 of the device group 04 in FIG. 2, the target amount of calculation is 100 MFLOPS, and the device computing capacity is also 100 MFLOPS. In other words, an extraction condition for the amount of calculation cannot be set larger than 100 MFLOPS. In this case, the latency has a lower order of priority than the target amount of calculation.

Thus, the setting unit 2 may set the extraction conditions identified by an extraction ID 0005 that can keep the amount of calculation to 100 MFLOPS or smaller.

The setting unit 2 may set the extraction conditions by using a policy and/or selection criteria other than the above-described information. However, extraction conditions including the model information exceeding a specification specified by the specification information are undesirable because the second machine learning model extracted based on the extraction conditions may not be allowed to be executed on the device 20.

The following describes the extraction unit 3, the storage controller 4, and the storage unit 5.

After the extraction unit 3 receives the extraction conditions from the setting unit 2, the storage controller 4 reads out the first machine learning model from the storage unit 5, and supplies the first machine learning model to the extraction unit 3. The extraction unit 3 extracts part of the first machine learning model as the second machine learning model based on the extraction conditions. In other words, each second machine learning model is smaller in size than the first machine learning model.

The first machine learning model registered in the storage unit 5 is a scalable neural network (NN) that is capable of changing the amount of calculation of a model of a neural network.

Description of Scalable NN

The first machine learning model is trained to have decomposed layers obtained by decomposing, by using a tensor decomposition method, a tensor of weighting coefficients in each layer (a fully connected layer or a convolutional layer) used in a general neural network into two or more tensors (decomposed tensors).

FIG. 4 is a diagram illustrating an example of the first machine learning model having the decomposed layers obtained by decomposing the tensor of the weighting coefficients. The example of FIG. 4 illustrates a case of decomposing a weight matrix W having an m×n size into two matrices each having a width R. Each component of the weight matrix W represents a weight having a real value. In the decomposition method, the weight matrix W is decomposed as illustrated in FIG. 4 by using, for example, a singular value decomposition (SVD) technique. While the example is illustrated herein in which the weight matrix W is decomposed into the two matrices, the weight matrix W may be decomposed into three or more matrices.

The extraction unit 3 extracts the second machine learning models from the first machine learning model in accordance with a rank R of the extraction conditions set within a range of 1≤R≤min(m, n). The rank R is a rank listed in the extraction condition list described above with reference to FIG. 3. Specifically, R corresponds to the number of basis vectors extracted after deleting basis vectors having lower contribution degrees from the basis vectors (columns of U and S or rows of $V^T$). A contribution degree $\alpha_j$ of a j-th basis vector (where j=1, . . . , min(m, n)) is calculated based on, for example, a level of a singular value. In the first embodiment, the contribution degree $\alpha_j$ is calculated using Expression 1 below that normalizes the singular value with respect to the maximum value.

$$\alpha_j = \frac{\sigma_j}{\max_{i=1,\ldots,min(m,n)} \sigma_i} \in [0, 1] \qquad (1)$$

In Expression 1, $\sigma_j$ represents the singular value of the j-th basis vector (a diagonal component of a diagonal matrix S). A variance criterion, an information criterion, or a discrimination criterion may be used as the contribution degree. The model size is represented as a sum of a number mR of components (weighting coefficients) of a weight matrix $U_R S_R$ and a number Rn of components of a weight matrix $V^T_R$.

When the first machine learning model has a plurality of the weight matrices W, that is, for example, in a case where the neural network has a plurality of layers, the above-described decomposition processing may be executed on each of the weight matrices W. The extraction unit 3 needs to execute the extraction processing only once on the first machine learning model.

The model size represents a size of the second machine learning model generated by the extraction unit 3.

The extraction unit 3 sets the width of the decomposed tensors of the tensor of the weighting coefficients in accordance with the rank R. In the first embodiment, each time the extraction conditions are received from the setting unit 2, the extraction unit 3 sets a width r ($1 \le r \le R$) of $(U_r S_r) V^T_r$ as the width r of the weight matrix W.

Figure 5:
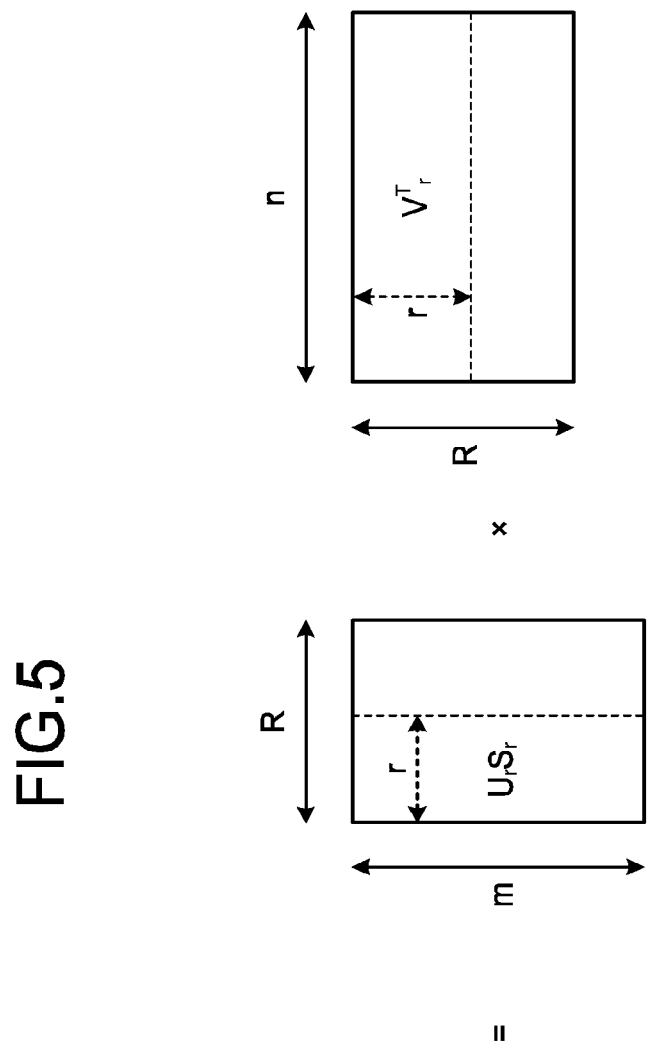
FIG. 5 is a diagram for explaining a width r of a weight matrix W of the first machine learning model in the first embodiment.

FIG. 5 is a diagram for explaining the width r of the weight matrix W of the first machine learning model in the first embodiment. The width r of the weight matrix W is determined by the number of columns r of the decomposed weight matrix $U_R S_R$ (the number of rows r of the decomposed weight matrix $V^T_R$). The extraction unit 3 selects r basis vectors ($1 \le r \le R$) from the R basis vectors to set the width of the decomposed tensors (a weight matrix $U_r S_r$ and a weight matrix $V^T_r$ in FIG. 5). Specifically, based on the extraction conditions received from the setting unit 2, the extraction unit 3 increases, until reaching a target model size, the width r of the weight matrix W by adding the basis vectors in the order from a basis vector having a larger contribution degree $\alpha_j$. Alternatively, the setting unit 14 reduces, until reaching a target model size, the width r of the weight matrix W by deleting the basis vectors in the order from a basis vector having a smaller contribution degree $\alpha_j$.

In the case where the first machine learning model has the multiple weight matrices W (has the multiple layers), the extraction unit 3 may independently set the width r until each of the weight matrices W has the target size. In this case, the width r is uniform if the numbers of parameters of the weight matrices W are the same as one another. Alternatively, the extraction unit 3 may arrange the contribution degrees of the basis vectors included in the weight matrices W in descending order or in ascending order, and then set the width r as described above. In this case, the width r of each of the weight matrices W including basis vectors having larger contribution degrees preferentially increases. Therefore, the width r is non-uniform even if the numbers of parameters of the weight matrices W are the same as one another.

FIG. 6A is a diagram illustrating a setting example of the width r (in a case of uniform) according to the first embodiment. FIG. 6B is a diagram illustrating a setting example of the width r (in a case of non-uniform) according to the first embodiment. The examples of FIGS. 6A and 6B illustrate cases of setting the width r of the neural network having three intermediate layers each having 512 nodes. Symbols h1 to h3 denote respective layers of the intermediate layers. As illustrated in FIG. 6B, in the case of the non-uniform way, layers having larger contribution degrees (layers corresponding to the weight matrices W including more basis vectors having larger contribution degrees) have the larger width r. A relation between the widths r of the weight matrices W and the model size is desirably registered in advance with the extraction condition list. While FIGS. 6A and 6B illustrate the cases of the neural network having the three intermediate layers, the number of the intermediate layers may be set to any value.

Referring back to FIG. 1, each time the width r ($1 \le r \le R$) is set to satisfy the extraction conditions, the extraction unit 3 executes the extraction processing, and supplies the extracted model as the second machine learning model to the providing unit 6. Specifically, the extraction unit 3 changes the first machine learning model to the second machine learning models represented by the two or more decomposed tensors each having the set width. In the first embodiment, each time the rank indicating the width r ($1 \le r \le R$) is received, the extraction unit 3 changes the width r of the weight matrix W, and supplies the changed model (weighting coefficients) as the second machine learning models to the providing unit 6. This operation can change the number of parameters (number of weighting coefficients) of the weight matrix W within a range of $(m+n) \le (m+n)r \le (m+n)R$.

Figure 7:
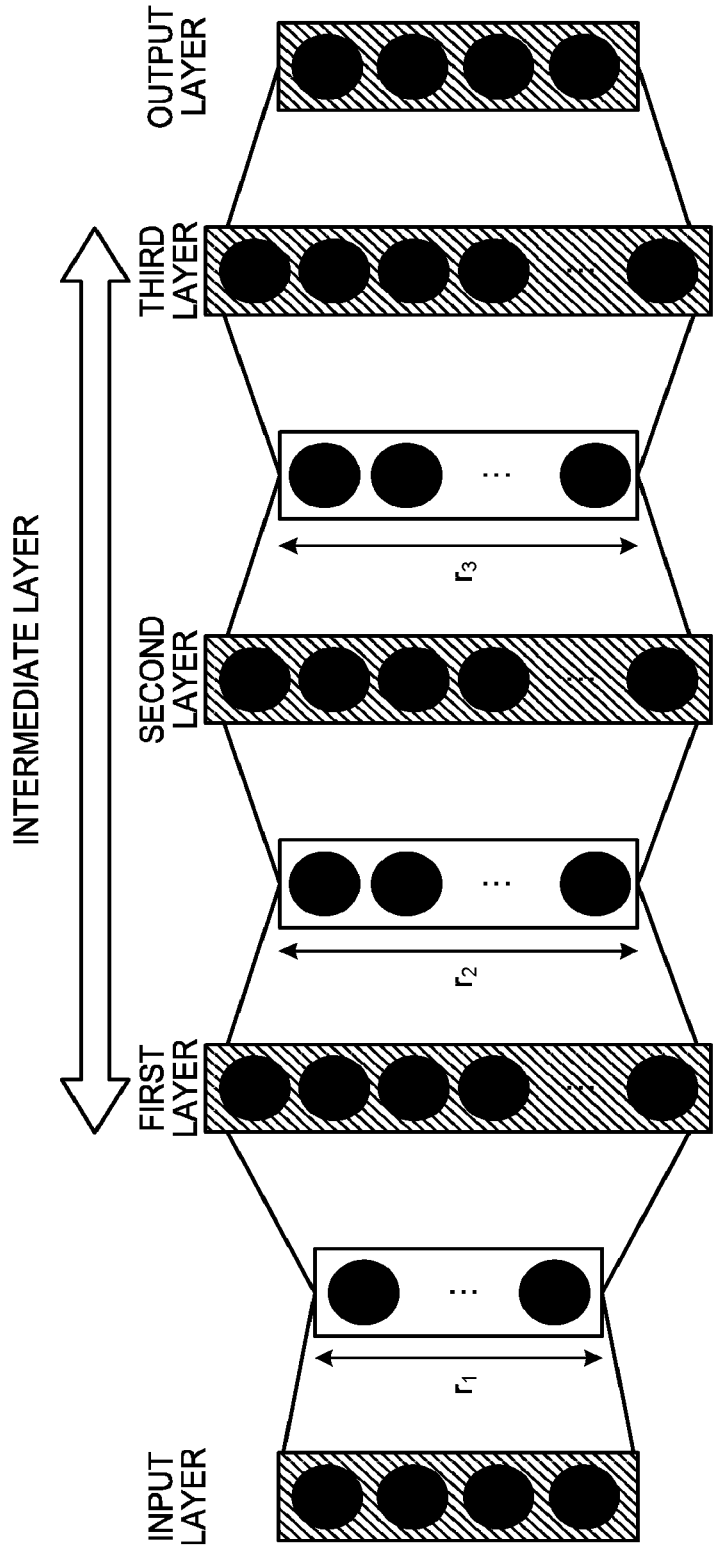
FIG. 7 is a diagram illustrating an example in which an extraction unit according to the first embodiment changes the width of the first machine learning model.

FIG. 7 is a diagram illustrating an example in which the extraction unit 3 according to the first embodiment changes the width of the first machine learning model. The example of FIG. 7 illustrates a case of changing the widths in the neural network having the three intermediate layers. In this case, each of the weight matrices W connected to a first layer, a second layer, and a third layer is decomposed into the weight matrices US and $V^T$ by the decomposition processing described above. The extraction unit 3 generates the second machine learning model having a particular rank from the first machine learning model having a full rank R by changing the weight matrix W connected to the first layer to the weight matrices US and $V^T$ each having a width r1, changing the weight matrix W connected to the second layer to the weight matrices US and $V^T$ each having a width r2, and changing the weight matrix W connected to the third layer to the weight matrices US and $V^T$ each having a width r3.

The extraction unit 3 may select part of the weight matrices included in the first machine learning model as a matrix or matrices to be decomposed. In other words, the extraction unit 3 may extract the second machine learning models from the first machine learning model by decomposing at least one of the weight matrices included in the first machine learning model into two or more matrices using the singular value decomposition technique, and changing the size of each of the decomposed matrices in accordance with the rank thereof.

When the model includes normalization processing, the extraction unit 3 corrects an influence of the width change by changing parameters of the normalization processing based on the width r ($1 \le r \le R$). For example, when the first machine learning model includes a normalization layer for executing the normalization processing, the extraction unit 3 corrects the parameters used in the normalization processing in accordance with the rank of the extraction conditions. In the first embodiment, a case will be described where the parameters of means and variances are corrected when the neural network has a batch normalization layer.

The batch normalization layer normalizes a vector y on which an input x has been projected through the weight matrix W, as given below.

$$y = W^T x \quad (2)$$

$$\tilde{y} = \Gamma Z^{-1/2}(y - \mu) + \beta \quad (3)$$

$$\Gamma = \text{diag}(\gamma_1, \gamma_2, \ldots, \gamma_n) \quad (4)$$

$$Z = \text{diag}(\sigma_1^2, \sigma_2^2, \ldots, \sigma_n^2) \quad (5)$$

In the above expressions, $\Gamma$ and $\beta$ denote a scale and bias parameters determined by learning, and $\mu$ and $Z$ denote the parameters of the mean and the variance determined by the learning. Corrected values $\mu_r$ and $Z_r$ of $\mu$ and $Z$ are calculated with the width r, as given below.

$$\mu_r = (V_r V_r^T)\mu \quad (6)$$

$$\Sigma_r = (V_r V_r^T)\Sigma(V_r V_r^T) \quad (7)$$

$$Z_r = \text{diag}(\Sigma_r) \quad (8)$$

In the above expressions, $\Sigma$ denotes a covariance matrix of y calculated using a learning sample. The symbol $Z_r$ denotes a diagonal matrix obtained by extracting only diagonal components of $\Sigma r$.

The following describes the providing unit 6.

After receiving the second machine learning models from the extraction unit 3, the providing unit 6 provides the second machine learning models over the network 200 to a device specified by the device information. The providing unit 6 may have a function to form the second machine learning models into a format suitable for communication. This format may be Extensible Markup Language (XML), JavaScript Object Notation (JSON), or Structured Query Language (SQL) generally used in, for example, Hypertext Transfer Protocol (HTTP) communications. The network 200 transmits the second machine learning models to the device 20 in accordance with a communication protocol.

After receiving the second machine learning models from the providing apparatus 10, the device 20 stores them in a memory or storage of the device 20. The device 20 has the inference function of the neural network, and executes processes on data obtained from, for example, a sensor by using the second machine learning models.

Example of Providing Method

The following describes a providing method according to the first embodiment.

Figure 8:
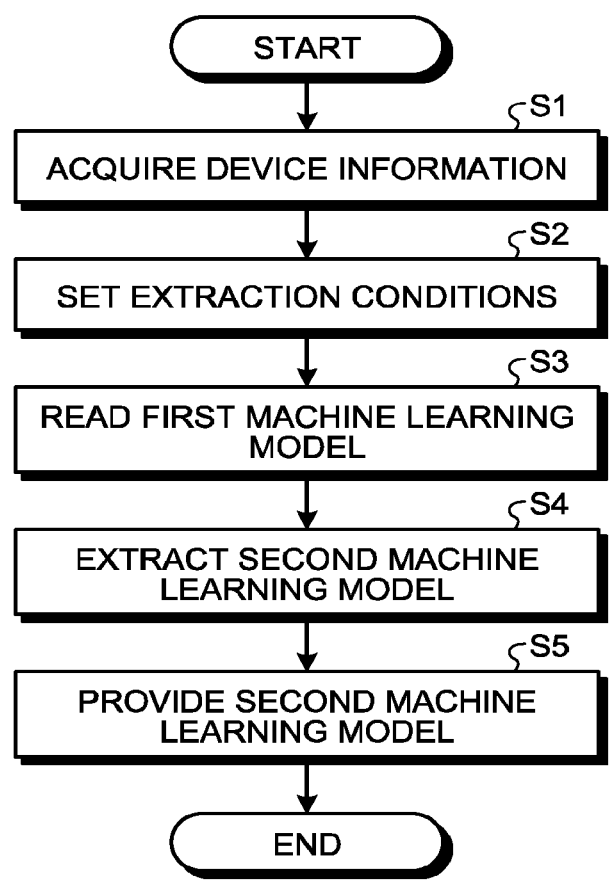
FIG. 8 is a flowchart illustrating an example of a providing method according to the first embodiment.

FIG. 8 is a flowchart illustrating an example of the providing method according to the first embodiment. Firstly, the acquisition unit 1 acquires the device information on the device 20 serving as a target of deployment (Step S1). Then, the setting unit 2 sets the extraction conditions described above based on the device information acquired by the processing at Step S1 (Step S2). Then, the storage controller 4 reads out the first machine learning model from the storage unit 5 (Step S3).

Next, based on the extraction conditions set by the processing at Step S2, the extraction unit 3 extracts part of the first machine learning model read by the processing at Step S3 as the second machine learning model (Step S4). Then, the providing unit 6 provides the second machine learning models extracted by the processing at Step S4 over the network 200 to the device 20 specified by the device information acquired by the processing at Step S1 (Step S5).

As described above, in the providing apparatus 10 according to the first embodiment, the storage controller 4 stores the first machine learning model capable of changing the amount of calculation of the model of the neural network into the storage unit 5. The acquisition unit 2 acquires the device information. Based on the device information, the setting unit 2 sets the extraction conditions representing the conditions for extracting the second machine learning model from the first machine learning models. Based on the extraction conditions, the extraction unit 3 extracts the second machine learning models from the first machine learning model. Then, the providing unit 6 provides the second machine learning models to the device 20 specified by the device information.

With the configuration above, the providing apparatus 10 according to the first embodiment is capable of providing a plurality of machine learning models requiring different amounts of calculation while keeping a computational cost and a storage cost low.

Second Embodiment

The following describes a second embodiment. In the description of the second embodiment, the same description as that of the first embodiment will not be repeated, and differences from the first embodiment will be described.

Example of Functional Configuration

Figure 9:
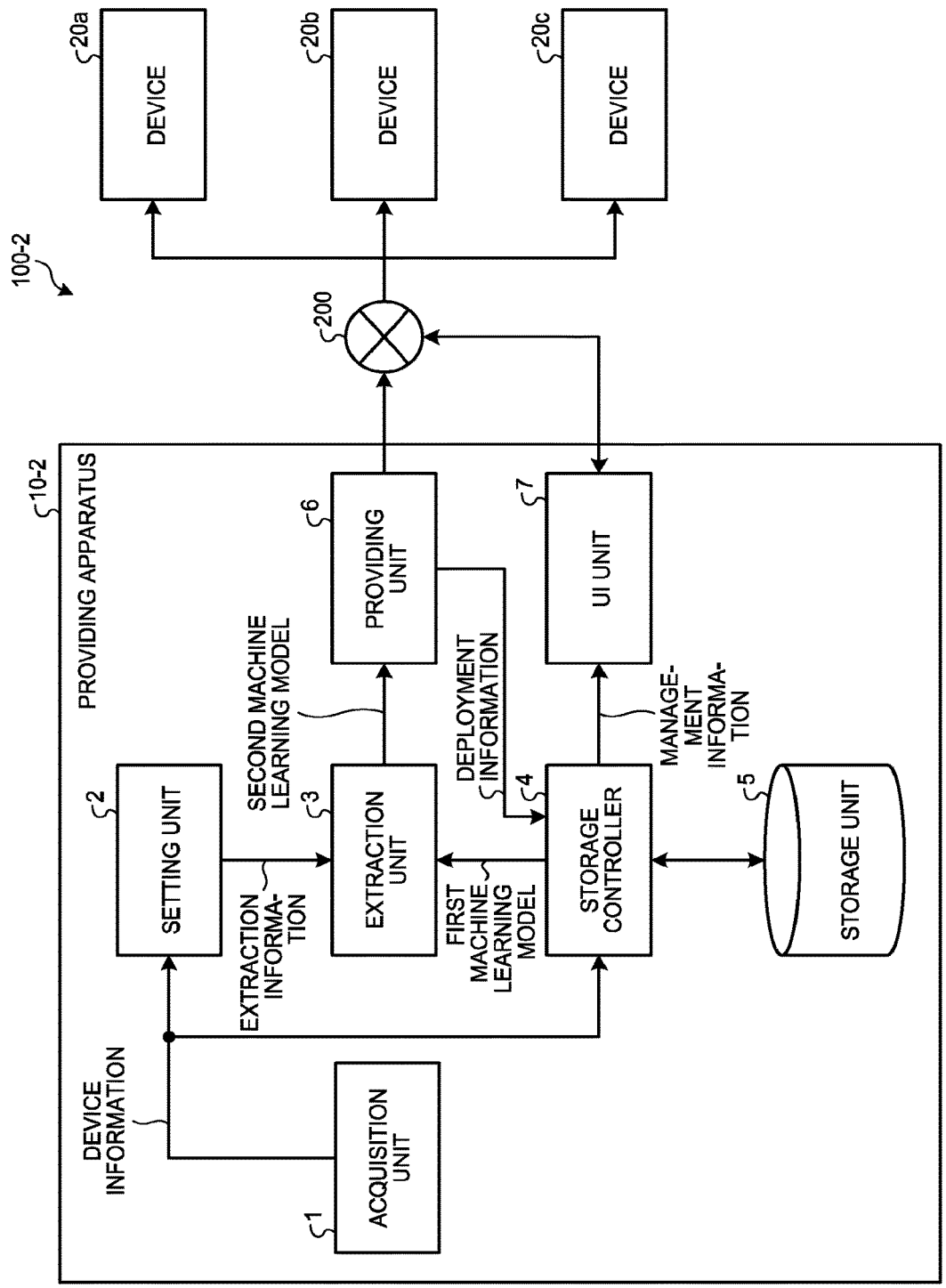
FIG. 9 is a diagram illustrating an example of a functional configuration of a providing system according to a second embodiment.

FIG. 9 is a diagram illustrating an example of a functional configuration of a providing system 100-2 according to the second embodiment. The providing system 100-2 according to the second embodiment includes a providing apparatus 10-2 and the devices 20a to 20c.

The providing apparatus 10-2 according to the second embodiment includes the acquisition unit 1, the setting unit 2, the extraction unit 3, the storage controller 4, the storage unit 5, the providing unit 6, and a user interface (UI) unit 7.

In the second embodiment, the UI unit 7 is added to the configuration of the first embodiment. The storage controller 4 receives the device information from the acquisition unit 1, receives deployment information from the providing unit 6, and stores, as management information in the storage unit 5, the device information, the deployment information, and learning information on the first machine learning model in a manner of making connections with each other.

Example of Management Information

FIG. 10 is a diagram illustrating an example of the management information according to the second embodiment. The management information according to the second embodiment includes the device information, the deployment information, and the learning information.

The device information includes the group ID and the device ID. The group ID and the device ID are the same as those described with reference to FIG. 2, and thus will not be described. In the example of the management information in FIG. 10, the management information stores the group ID and the device ID in a manner of connecting with the device information illustrated in FIG. 2.

The deployment information includes a deployment date and the extraction ID. The deployment date is a date of deployment of the second machine learning models extracted so as to satisfy the extraction conditions identified by the extraction ID. The extraction ID is the same as that described with reference to FIG. 3, and therefore will not be described.

The learning information includes a model ID, a model generation date, and a data ID. The model ID is identification information for identifying the first machine learning model. The model generation date represents a date when the first machine learning model was generated. The data ID is identification information for identifying a learning dataset that was used for learning of the first machine learning model.

Figure 11:
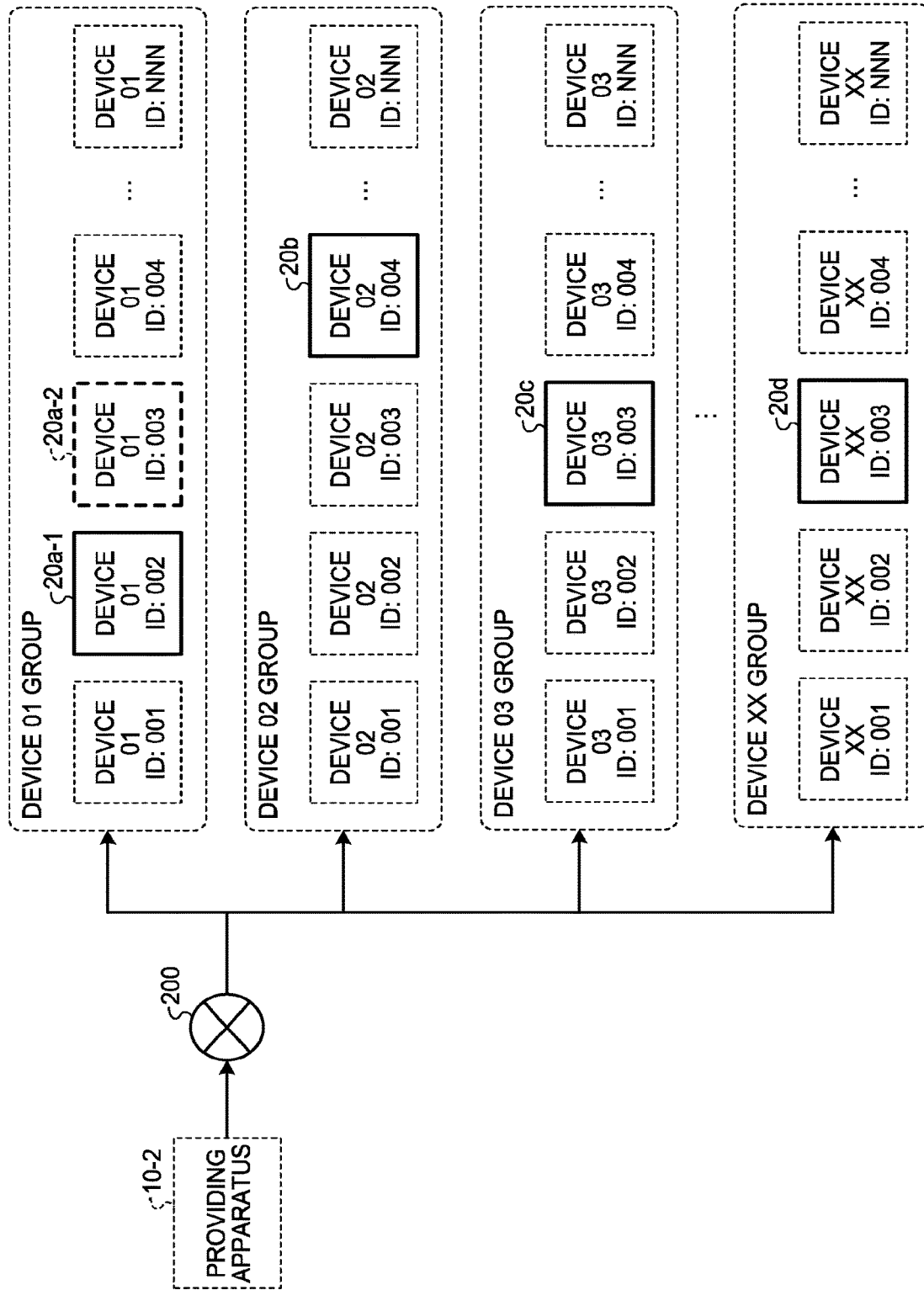
FIG. 11 is a diagram for explaining a specific example of a model management according to the second embodiment.

FIG. 11 is a diagram for explaining a specific example of a model management according to the second embodiment. In the example of FIG. 11, data of a device 20a-1 is registered in the second and third rows of the management information in FIG. 10, and the extraction ID is found to have been updated because the deployment dates thereof differ from each other. Therefore, it is understood that the second machine learning models have been updated. Data in the fifth row of the management information in FIG. 10 indicates that the model ID of a device 20a-2 has been updated. Therefore, it is understood that the first machine learning model serving as a source of extraction of the second machine learning models has been updated.

Referring back to FIG. 1, when the UI unit 7 has received a request over the network 200, the UI unit 7 discloses the management information to a user by outputting the management information in response to the request.

The following describes operations according to the second embodiment.

Operation Example at Time of Model Deployment

After providing the second machine learning models to the device 20, the providing unit 6 generates the deployment information to which accompanying information at the time of provision to the extraction conditions has been added, and supplies the deployment information to the storage controller 4. The accompanying information represents, for example, a deployment date/time, transmission/reception results at the time of the deployment, and a transmission time at the time of the deployment, and error information. The storage controller 4 stores, as the management information in the storage unit 5, the deployment information and the device information acquired by the acquisition unit 1 in a manner of making connections with each other.

By the operation above, information, which represents what type of the second machine learning models were provided to which device at what time, can be managed in a manner of connecting with various types of information. Specifically, for example, the device information, the extraction conditions, the deployment information, and the learning information described above can be managed in a manner of connecting with one another. By managing these pieces of information in this manner, the UI unit 7 can immediately inform the user of what type of model was provided when, where, and to which device, in an event of occurrence of a problem in a specific device.

Operation Example after Reception of Disclosure Request

The following describes an operation of the providing apparatus 10-2 after receiving a disclosure request for the management information over the network 200.

After receiving the disclosure request for the management information, the UI unit 7 discloses the management information by returning a response satisfying a search condition specified by the disclosure request. A transmission source of the disclosure request is, for example, a device, such as the device 20, connected to the network 200.

Specifically, the UI unit 7 receives, for example, as an application program interface (API)-based application, the disclosure request for the management information, and returns a response to the disclosure request. For example, when the UI unit 7 has received the disclosure request for all pieces of the past management information about a device ID 0001 of a device group 01, the UI unit 7 searches the management information for all pieces of data corresponding to the device ID 0001 of the device group 01, and returns the response including the search results to the transmission source of the disclosure request.

For example, the UI unit 7 may receive, as a web application, the disclosure request for the device ID 0001 of the device group 01 entered into a web screen, and display the above-described search results on a screen of the web application. On the screen, the device information, the deployment information, and the learning information are displayed. This operation allows the user to view which trained model, when, under which data ID and model ID is deployed to which device ID, when, and under which extraction ID, on the list screen. The operation also allows the user to immediately know, for example, an update history and a problem history of the model.

Example of Providing Method

The following describes an example of a providing method according to the second embodiment.

Figure 12:
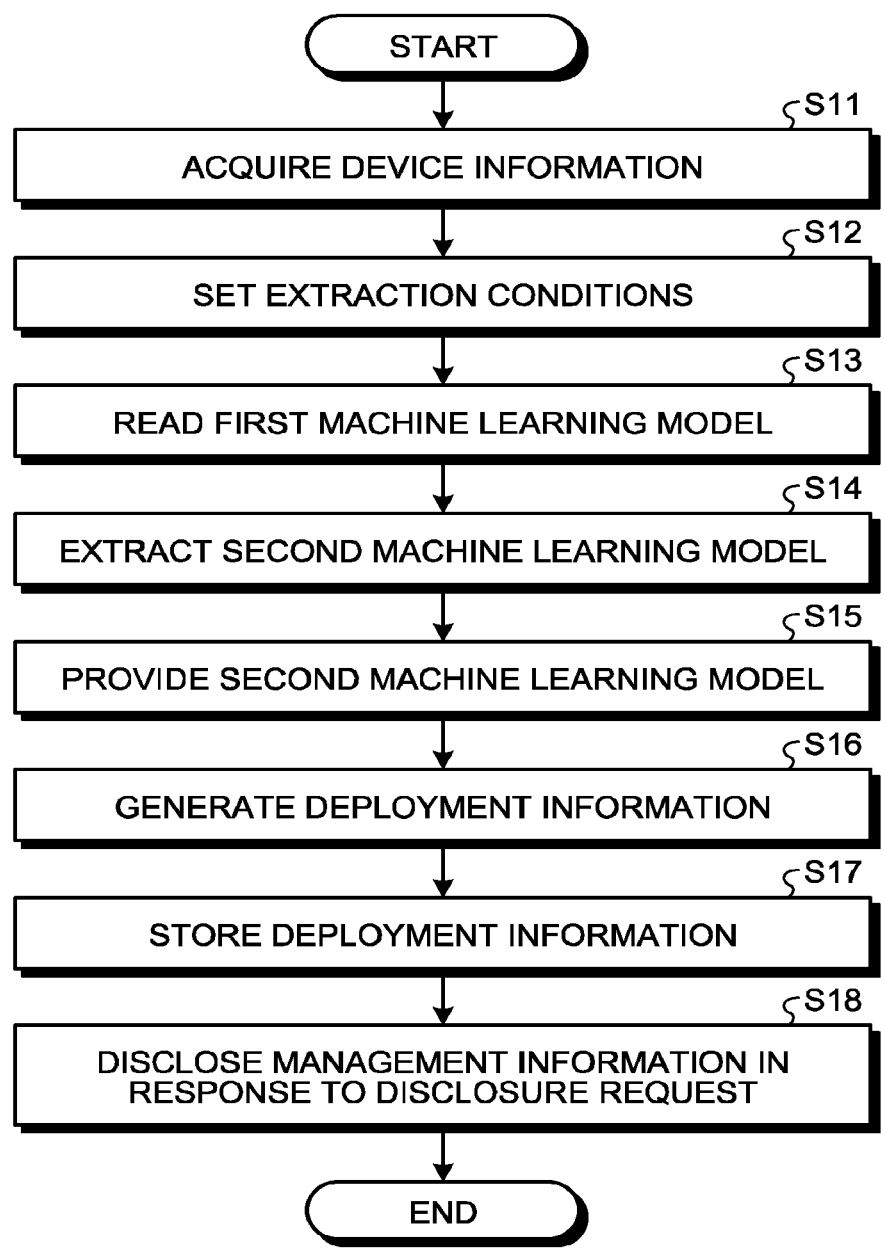
FIG. 12 is a flowchart illustrating an example of a providing method according to the second embodiment.

FIG. 12 is a flowchart illustrating the example of the providing method according to the second embodiment. The description of Steps S11 to S15 is the same as that of Steps S1 to S5 of the first embodiment, and therefore will not be repeated.

The providing unit 6 generates the deployment information on the second machine learning models provided by the processing at Step S15 (Step S16). The storage controller 4 stores in the storage unit 5 the deployment information generated by the processing at Step S16 (Step S17). After that, the UI unit 7 discloses the management information in response to the disclosure request (Step S18).

As described above, the second embodiment enables the management as to when, where, and how the first machine learning model capable of performing the inference with any model size was trained, and enables the management as to when, where, and how the first machine learning model was provided as the second machine learning models. Using the management information according to the second embodiment can reproduce a model having the same ID at the time of deployment from an extraction ID at the time of deployment without requiring the storage cost for managing the model itself. When a problem has occurred, the same model as that at the time of deployment can be generated and verified, so that a management cost can be reduced. The second embodiment enables the list management as to which model was deployed to which device, in conjunction with other information. Therefore, for example, even if the devices 20 as targets of the deployment have increased to ten thousand devices, the devices 20 can be identified over the network 200, and a new model with, for example, a changed model size can be deployed thereto. As a result, no relearning is required, so that a learning cost can be reduced.

Third Embodiment

The following describes a third embodiment. In the description of the third embodiment, the same description as that of the second embodiment will not be repeated, and differences from the second embodiment will be described.

Example of Functional Configuration

Figure 13:
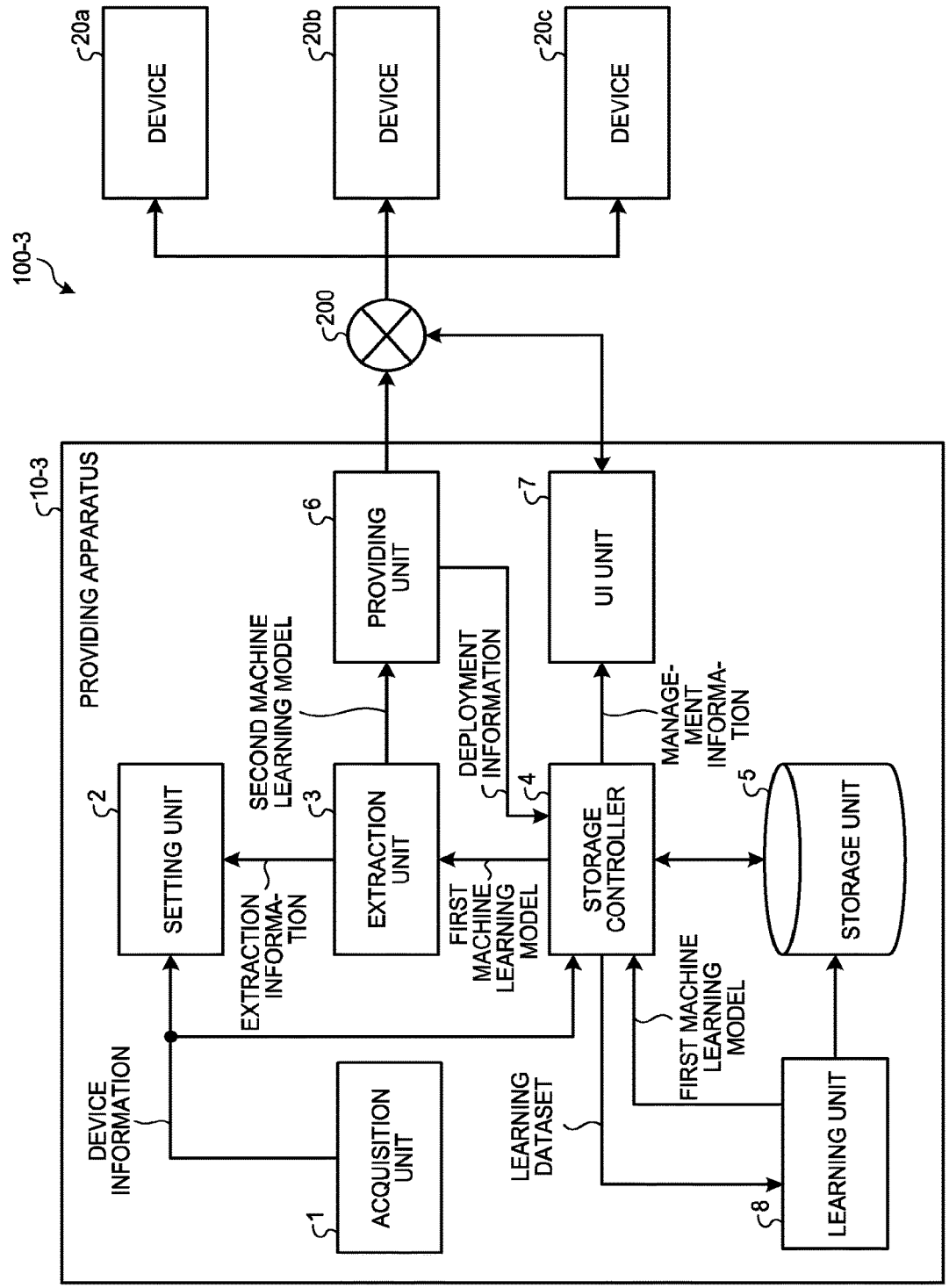
FIG. 13 is a diagram illustrating an example of a functional configuration of a providing system according to a third embodiment.

FIG. 13 is a diagram illustrating an example of a functional configuration of a providing system 100-3 according to the third embodiment. The providing system 100-3 according to the third embodiment includes a providing apparatus 10-3 and the devices 20a to 20c.

The providing apparatus 10-3 according to the third embodiment includes the acquisition unit 1, the setting unit 2, the extraction unit 3, the storage controller 4, the storage unit 5, the providing unit 6, the UI unit 7, and a learning unit 8.

In the third embodiment, the learning unit 8 is added to the configuration of the foregoing second embodiment. The storage unit 5 stores a learning database (DB) with learning datasets registered therein.

The learning DB is a database in which all the learning datasets used for learning of the neural network are registered. For example, in a case of developing a model for performing object detection that is used by a driving assist of an automobile, a large amount of paired data, in which images captured by using automobiles or the like and label images for teaching objects in the images are paired, is registered in advance in the learning DB. Also a large number of registered neural network models used for learning the model is registered in the learning DB, as some of the learning datasets.

The third embodiment will be described by way of an example of an object detection task of detecting a target object from an image. For example, a conventional technique called "single shot detection (SSD)" is disclosed as a conventional technique for object detection (refer to R. T. Q. Chen, et al., "Neural Ordinary Differential Equations", ArXiv preprint, https://arxiv.org/abs/1806.07366).

Herein, an example of using a ResNet-N (ResNet: Residual Network) in a feature extraction portion at a first stage of the above-mentioned SSD will be described. The ResNet is a network structure used in various tasks in recent years, and is a deep learning model that improves model representation capability and performance by combining a plurality of ResBlocks to deepen the neural network, and that is capable of stable learning even when the network is deep. The symbol N above represents the depth of the ResNet, and various structures, such as a ResNet-34 and a ResNet-50, are known. These models before being trained have been registered in the learning DB. While the example of the ResNet for simplification has been described, the weight matrix W included in the convolutional layer and the fully connected layer used in the model before being trained has a decomposable structure in the same way as the first machine learning model.

The storage controller 4 reads out a learning dataset from the learning DB, and supplies the learning dataset to the learning unit 8. The learning unit 8 trains the first machine learning model by using the learning dataset. The first machine learning model is stored, as the learning information, in the storage unit 5 together with information such as the data ID used and a date/time of generation of the model.

Operation Example of Learning Unit

Figure 14:
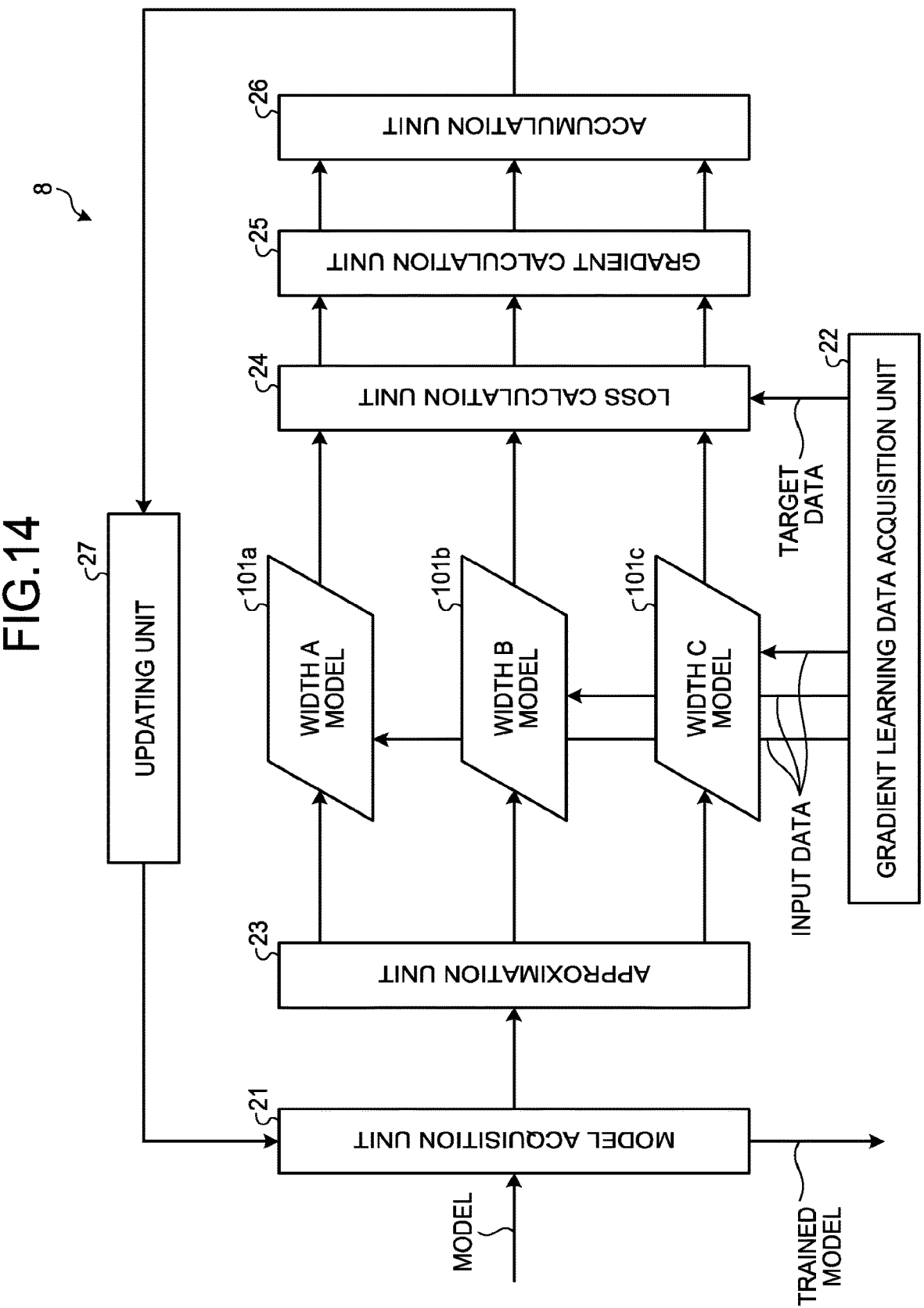
FIG. 14 is a diagram illustrating an example of a functional configuration of a learning unit according to the third embodiment.

FIG. 14 is a diagram illustrating an example of a functional configuration of the learning unit 8 according to the third embodiment. The learning unit 8 according to the third embodiment includes a model acquisition unit 21, a learning data acquisition unit 22, an approximation unit 23, a loss calculation unit 24, a gradient calculation unit 25, a gradient accumulation unit 26, and an updating unit 27.

The learning dataset includes the input data and target data for the model. The target data represents output data (correct answer label) of the model corresponding to the input data. At each step during the learning, the learning data acquisition unit 22 supplies all or some of the input data to width A to C models 101a to 101c, and supplies all or part of the target data to the loss calculation unit 24.

The approximation unit 23 approximates the weight matrix W having a size of m×n to a weight matrix $W_r$ of a lower rank. The above-mentioned singular value decomposition is used as an approximation method such that $W_r = U_r S_r V_r^T$. Examples of a value used as an order r (the width r described above) include a value determined in advance within a range of 1≤R≤min(m, n), a value calculated using, for example, a cumulative contribution rate, and a randomly selected value.

When the model has the multiple weight matrices W, the approximation unit 23 may approximate all the weight matrices W, or may approximate one or some of the weight matrices W. In the selection of the r basis vectors included in the weight matrix $W_r$, the r basis vectors may be selected in descending order of the contribution degree determined based on, for example, the singular value. The approximation unit 23 uses the approximation method described above to generate a plurality of approximate models of different ranks r from the single model. The number of the approximate models is not limited to three, and may be any number.

In the example of FIG. 14, the approximation unit 23 generates the width A to C models 101a to 101c as the approximate models. The width A model 101a is a model represented by a weight matrix $W_A$ for which the width r=A. The width B model 101b is a model represented by a weight matrix $W_B$ for which the width r=B. The width C model 101c is a model represented by a weight matrix $W_C$ for which the width r=C. The approximate models share all parameters except the weight matrices $W_A$ to $W_C$, and execute processing.

The loss calculation unit 24 calculates a loss function $L_i(D, W_{ri}, \Theta)$ (i=1, ..., M) of each of the approximate models of rank ri (i=1, ..., M). In the above function, M denotes the number of the models, and, for example, M=3 when the three models illustrated in FIG. 7 are used. The symbol D denotes the learning data. The symbol $L_i$ denotes the loss function, and, for example, a cross-entropy function is used as the loss function in, for example, classification problems. The symbol $W_{ri}$ denotes a weight matrix for the approximate model of the rank ri. The symbol $\Theta$ denotes all learnable parameters except $W_{ri}$. A regularization function, such as that for $L_2$ regularization of the weights, may be added to the loss function.

The gradient calculation unit 25 uses Expressions 9 and 10 below to differentiate the loss function to calculate gradients for each of the approximate models.

$$\nabla_w^{(i)} = \frac{\partial \mathcal{L}_i(D, W_{ri}, \Theta)}{\partial W} \quad (9)$$

$$\nabla_\Theta^{(i)} = \frac{\partial \mathcal{L}_i(D, W_{ri}, \Theta)}{\partial \Theta} \quad (10)$$

The differential with respect to the weight matrix W given by Expression (9) is calculated not with respect to the weight matrix $W_{ri}$ for each of the approximate models, but with respect to the weight matrix W before the approximation. Specifically, for example, the differential is calculated by Expression 11 or 12 below.

$$\frac{\partial \mathcal{L}_i(D, W_{ri}, \Theta)}{\partial W} = U_{ri} U_{ri}^T \frac{\partial \mathcal{L}_i(D, W_{ri})}{\partial W_{ri}} \quad (11)$$

$$\frac{\partial \mathcal{L}_i(D, W_{ri}, \Theta)}{\partial W} = \frac{\partial \mathcal{L}_i(D, W_{ri})}{\partial W_{ri}} V_{ri} V_{ri}^T \quad (12)$$

In the above expressions, $U_{ri}$ and $V_{ri}$ denote matrices obtained when the model is approximated to have the rank ri.

The gradient accumulation unit 26 accumulates the gradients of the approximate models, and supplies the result to the updating unit 27. Specifically, the gradient accumulation unit 26 uses Expressions 13 and 14 below to accumulate the gradients of the approximate models.

$$\nabla_w = \sum_{i=1}^{M} \alpha_i \nabla_w^{(i)} \quad (13)$$

$$\nabla_\Theta = \sum_{i=1}^{M} \beta_i \nabla_\Theta^{(i)} \quad (14)$$

In the above expressions, $\alpha_i$ and $\beta_i$ (i=1, ..., M) denote coefficients representing weights for the respective losses. Examples of $\alpha_i$ and $\beta_i$ include values determined in advance, values calculated in accordance with the rank (width r) of each of the models, and values determined by progress of the learning. When the regularization function, such as that for the $L_2$ regularization of the weights, is added to the loss function, a gradient of the regularization function is added to Expressions 13 and 14 above.

The updating unit 27 uses the gradients accumulated by the gradient accumulation unit 26 to simultaneously minimize the loss functions of the approximate models, and thus updates the parameters of the model to be trained. A stochastic gradient method, such as momentum stochastic gradient descent (SGD) and Adam, may be used as an update method.

The learning is performed in the above-described order, and the first machine learning model trained by the learning unit 8 is stored in the storage unit 5.

Example of Providing Method

The following describes an example of a learning method according to the third embodiment.

Figure 15:
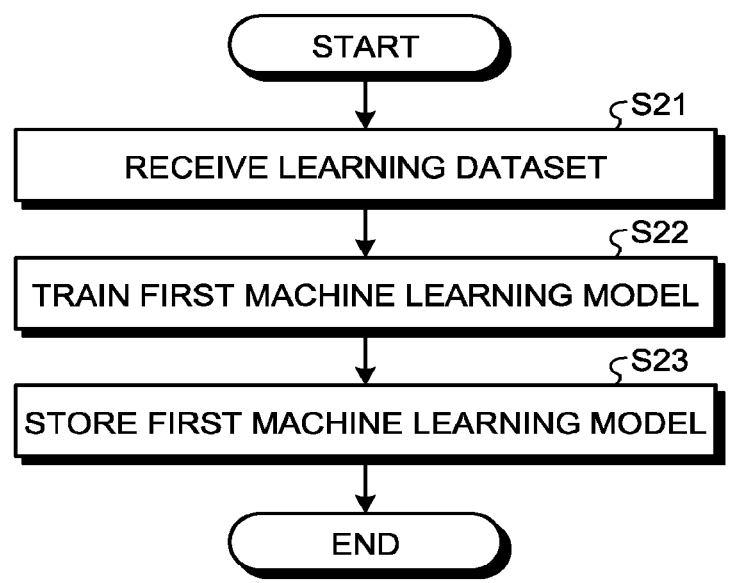
FIG. 15 is a flowchart illustrating an example of a learning method according to the third embodiment.

FIG. 15 is a flowchart illustrating an example of the learning method according to the third embodiment. Firstly, the learning unit 8 receives the learning dataset read by the storage controller 4 (Step S21). The learning unit 8 trains the first machine learning model by using the learning dataset received by the processing at Step S21 (Step S22). Then, the storage controller 4 stores, in the storage unit 5, the first machine learning model trained by the processing at Step S22 (Step S23).

As described above in the third embodiment, since the providing apparatus 10-3 includes the learning unit 8, the learning process, the model extraction process, and the model providing process can be treated in a unified manner in the same system. Therefore, it is possible to treat those processes by the database for integrally managing the information related to the respective processes. This configuration is capable of preventing the information management from being dispersed, and reducing an effort for management operations performed by the user who conducts each of the operations.

The following describes a case of using neural ordinary differential equations (ODEs) as a modification of the first to third embodiments described above.

Description of Neural ODEs

As a technique capable of freely changing the neural network in the depth direction at the time of inference, a method of representing the neural network as ordinary differential equations is disclosed as a conventional technique (R. T. Q. Chen, et al., "Neural Ordinary Differential Equations", ArXiv preprint, https://arxiv.org/abs/1806.07366, where an abbreviation "ODEs" is used).

A general neural network is configured by combining layers for a finite number of times of processing. The general neural network carries out the inference processing by, for example, executing the convolutional processing a plurality of times. In the case of the ODEs, the processing layers are treated as a continuous representation, and the inference can be performed by using an arbitrary processing layers (for example, a decimal number of layers, such as 8.9 layers, can be treated although conventionally 10 layers are treated). The ResNet used in, for example, image recognition processing can be expressed in the form of ordinary differential equations and can be trained, thereby freely changing evaluation points when solutions are obtained at the time of inference. This technique can express layers for a plurality of times of processing by using parameters of a single ResBlock included in the ResNet, so that a higher memory efficiency is achieved. Since the inference can be performed with any evaluation points (number of layers), the amount of calculation and the accuracy can be adjusted. By training a model using this technique to obtain the first machine learning model, and setting the number of evaluation points for representation as a rank in the extraction condition list of FIG. 3, the model can be expressed (the second machine learning models can be generated) not only in the width direction but also in the depth direction (in the direction of the number of layers of the neural network) with any amount of calculation. In this case, the model size does not change. Therefore, the extraction condition list optimal for the devices 20 only needs to be created taking into account the amount of calculation and the inference information.

In this modification, the first machine learning model includes a ResNet block, and the extraction conditions include the number of layers of the second machine learning models. The extraction unit 3 treats the ResNet block as the ordinary differential equations, and decomposes the ResNet block into a network representation having the number of layers specified by the extraction conditions, and thereby extracts the second machine learning models from the first machine learning model.

Finally, the following describes an example of a hardware configuration of the providing apparatus 100 (100-2 and 100-3) according to the first to third embodiments.

Example of Hardware Configuration

Figure 16:
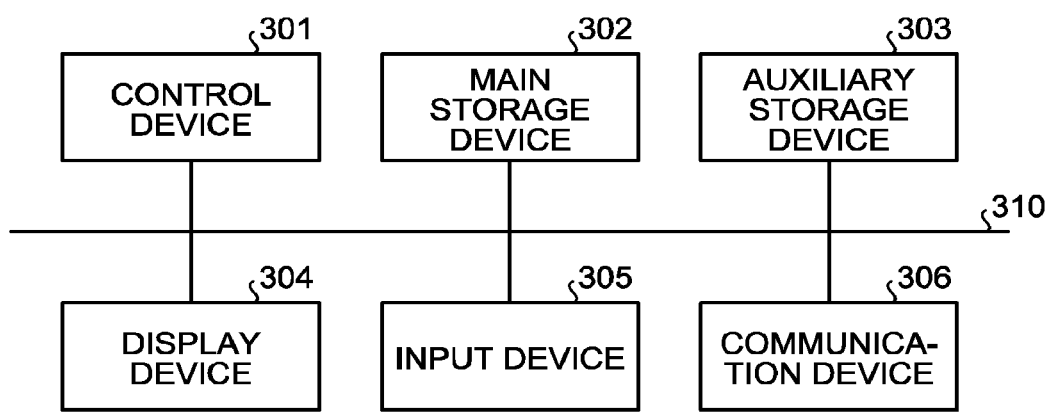
FIG. 16 is a diagram illustrating an example of a hardware configuration of a providing apparatus according to any one of the first to third embodiments.

FIG. 16 is a diagram illustrating an example of a hardware configuration of each of the providing apparatus 10 according to the first embodiment. The hardware configurations of the providing apparatuses 10-2 and 10-3 according to the second and third embodiment are the same as the following. The providing apparatus 10 may be implemented by one hardware configuration, or may be implemented by combining a plurality of hardware configurations.

The providing apparatus 10 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected together over a bus 310.

The control device 301 is a hardware processor such as, for example, a central processing unit (CPU). The control device 301 executes a computer program that is read from the auxiliary storage device 303 and loaded on the main storage device 302. The main storage device 302 is a memory including, for example, a read-only memory (ROM) and a random access memory (RAM). The main storage device 302 is generally implemented by, for example, a dynamic RAM (DRAM). The auxiliary storage device 303 is, for example, a hard disk drive (HDD), a solid-state drive (SSD), or a memory card.

The display device 304 displays display information. The display device 304 is, for example, a GPU. The display device 304 may herein be connected to, for example, a liquid crystal display as an externally displaying function. The input device 305 is an input interface for operating the providing apparatus 10. The input device 305 is, for example, a keyboard and a mouse. When the providing apparatus 10 is a smart device, such as a smartphone or a tablet computer, the display device 304 and the input device 305 are, for example, a touchscreen panel. The communication device 306 is an interface for communicating with other devices.

The computer program to be executed on the providing apparatus 10 (10-2 or 10-3) according to any one of the first to third embodiments is provided as a computer program product by being recorded as a file in an installable format or an executable format on a computer-readable storage medium, such as a compact disc read-only memory (CD-ROM), a memory card, a compact disc-recordable (CD-R), or a digital versatile disc (DVD).

The computer program to be executed on the providing apparatus 10 (10-2 or 10-3) according to any one of the first to third embodiments may be provided by being stored on a computer connected to a network, such as the Internet, and downloaded over the network. The computer program to be executed on the providing apparatus 10 (10-2 or 10-3) according to any one of the first to third embodiments may also be provided over a network, such as the Internet, without being downloaded.

The computer program to be executed on the providing apparatus 10 (10-2 or 10-3) according to any one of the first to third embodiments may also be provided by being incorporated in advance in the ROM or the like.

The computer program to be executed on the providing apparatus 10 (10-2 or 10-3) according to any one of the first to third embodiments has a modular configuration including functional blocks implementable also by the computer program among the functional blocks of FIG. 1 (FIG. 9 or FIG. 13) described above. As actual hardware, the control device 301 reads the computer program from the storage medium and executes the computer program to load the above-described functional blocks in the main storage device 302. In other words, the above-described functional blocks are generated in the main storage device 302.

Part of or all the above-described functional blocks of FIG. 1 (FIG. 9 or FIG. 13) may be implemented by hardware, such as an IC (integrated circuit), without being implemented by software.

When a plurality of hardware processors are used to implement the functions, each of the processors may implement one of the functions, or two or more of the functions.

The providing apparatus 10 (10-2 or 10-3) according to any one of the first to third embodiments may be implemented in any mode of operation. The providing apparatus 10 (10-2 or 10-3) according to any one of the first to third embodiments may be operated, for example, as a cloud system on a network.

As described above, the providing apparatus 10 (10-2 or 10-3) according to any one of the first to third embodiments only needs to include, for example, a single common scalable model (as the first machine learning model) that is freely changeable in processing capability for the same task. The setting unit 2 sets the extraction conditions based on the device information acquired by the acquisition unit 1, and the storage unit 5 stores the management information including the device information on a plurality of edge devices and the deployment information satisfying the extraction conditions (refer to FIG. 10). This configuration can reduce the computational cost for training, for example, the model for the edge devices, and can also reduce the storage cost of the model for the edge devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A providing apparatus comprising:
a memory; and
a hardware processor coupled to the memory and configured to:
store, in the memory, a first machine learning model capable of changing an amount of calculation of a model of a neural network;
acquire device information;
set, based on the device information, extraction conditions representing conditions for extracting second machine learning models from the first machine learning model;
extract the second machine learning models from the first machine learning model based on the extraction conditions; and
provide the second machine learning models to a device specified by the device information.

2. The apparatus according to claim 1, wherein a size of each of the second machine learning models is smaller than a size of the first machine learning model.

3. The apparatus according to claim 1, wherein the hardware processor is further configured to store, as management information in the memory, the device information and the extraction conditions in a manner of making connections with each other.

4. The apparatus according to claim 3, wherein the hardware processor is further configured to:
train the first machine learning model; and
store, in the memory, learning information on the first machine learning model in a manner of making connections with the management information.

5. The apparatus according to claim 4, wherein the learning information includes:
identification information for identifying the first machine learning model;
a date when the first machine learning model was generated; and
identification information for identifying a learning dataset that was used for learning of the first machine learning model.

6. The apparatus according to claim 3, further comprising a user interface (UT) configured to receive a disclosure request for the management information and return a response satisfying a search condition specified by the disclosure request.

7. The apparatus according to claim 1, wherein the device information includes identification information for identifying the device and specification information representing hardware specifications of the device.

8. The apparatus according to claim 7, wherein the device information further includes control information on inference processing using the second machine learning models.

9. The apparatus according to claim 8, wherein the control information includes at least one of:
- a target amount of calculation of the inference processing executed on a device that is provided with the second machine learning models;
- a target model size of the second machine learning models used for the inference processing executed on the device;
- a target speed of the inference processing executed on the device; and
- a target recognition rate of the inference processing executed on the device.

10. The apparatus according to claim 1, wherein
the extraction conditions include a rank for controlling the amount of calculation of the second machine learning models, and
the hardware processor is further configured to extract the second machine learning models from the first machine learning model by:
- decomposing at least one of weight matrices included in the first machine learning model into two or more matrices by using a singular value decomposition technique; and
- changing a size of each of the decomposed matrices in accordance with the rank.

11. The apparatus according to claim 1, wherein
the extraction conditions include a number of layers of the second machine learning models,
the first machine learning model includes a Residual Network (ResNet) block, and
the hardware processor is further configured to extract the second machine learning models from the first machine learning model by decomposing the ResNet block into a network representation having the number of layers specified by the extraction conditions while treating the ResNet block as ordinary differential equations.

12. A providing method implemented by a computer, the method comprising:
- reading out, from a memory, a first machine learning model capable of changing an amount of calculation of a model of a neural network;
- acquiring device information;
- setting, based on the device information, extraction conditions representing conditions for extracting second machine learning models from the first machine learning model;
- extracting the second machine learning models from the first machine learning model based on the extraction conditions; and
- providing the second machine learning models to a device specified by the device information.

13. A computer program product comprising a non-transitory computer-readable recording medium on which an executable program is recorded, the program instructing a computer to:
- store, in a memory, a first machine learning model capable of changing an amount of calculation of a model of a neural network;
- acquire device information;
- set, based on the device information, extraction conditions representing conditions for extracting second machine learning models from the first machine learning model;
- extract the second machine learning models from the first machine learning model based on the extraction conditions; and
- provide the second machine learning models to a device specified by the device information.

* * * * *